United States Patent
Holly (10) Patent No.: US 7,142,147 B2
(45) Date of Patent: Nov. 28, 2006

(54) METHOD AND APPARATUS FOR DETECTING, LOCATING, AND IDENTIFYING MICROWAVE TRANSMITTERS AND RECEIVERS AT DISTANT LOCATIONS

(75) Inventor: Sandor Holly, Woodland Hills, CA (US)

(73) Assignee: The Boeing Company, Chicago, IL (US)

( * ) Notice: Subject to any disclaimer, the term of this patent is extended or adjusted under 35 U.S.C. 154(b) by 172 days.

(21) Appl. No.: 10/994,811

(22) Filed: Nov. 22, 2004

(65) Prior Publication Data

US 2006/0109159 A1    May 25, 2006

(51) Int. Cl.
*G01S 7/38* (2006.01)

(52) U.S. Cl. ............................. 342/13; 342/14; 342/54; 342/59; 342/126; 342/175

(58) Field of Classification Search ................. 342/13, 342/14, 52, 59, 90, 98–103, 118, 126, 175; 455/1
See application file for complete search history.

(56) References Cited

U.S. PATENT DOCUMENTS

| | | | | |
|---|---|---|---|---|
| 4,604,638 A | * | 8/1986 | Matsuda | ..................... 257/132 |
| 5,432,605 A | * | 7/1995 | Naqwi et al. | ................ 356/485 |
| 6,512,385 B1 | * | 1/2003 | Pfaff et al. | ................... 324/753 |
| 6,864,825 B1 | * | 3/2005 | Holly | .......................... 342/13 |
| 2004/0120093 A1 | * | 6/2004 | Holly | .......................... 361/143 |
| 2005/0179611 A1 | * | 8/2005 | Holly | .......................... 343/820 |
| 2006/0109159 A1 | * | 5/2006 | Holly | .......................... 342/13 |

* cited by examiner

*Primary Examiner*—John B. Sotomayor
(74) *Attorney, Agent, or Firm*—Alston & Bird LLP (57) ABSTRACT

Methods and apparatuses for detecting, locating, and identifying microwave transmitters and receivers at distant locations are disclosed. First and second electromagnetic beams at first and second frequencies, respectively, are transmitted in first and second directions. The second frequency is offset from the first frequency to define an interference difference frequency. As such, the first and second electromagnetic beams interfere at a far field distance corresponding to an intersection of the first and second electromagnetic beams. In the far field the beams interfere with microwave devices that reradiate a return radiation at the difference frequency. The methods and apparatuses detect the return radiation at the difference frequency, such as by way of a receiver, and locate the interference zone to determine the location of the microwave device, such as by a processor.

25 Claims, 5 Drawing Sheets

METHOD AND APPARATUS FOR DETECTING, LOCATING, AND IDENTIFYING MICROWAVE TRANSMITTERS AND RECEIVERS AT DISTANT LOCATIONS

FIELD OF THE INVENTION

The present invention relates to methods and apparatuses for detecting, locating, and identifying microwave transmitters and receivers at distant locations, and, more particularly, to a method and apparatus for identifying microwave transmitters and receivers at distant locations using controlled and directed electromagnetic energy.

BACKGROUND OF THE INVENTION

Figure 1:
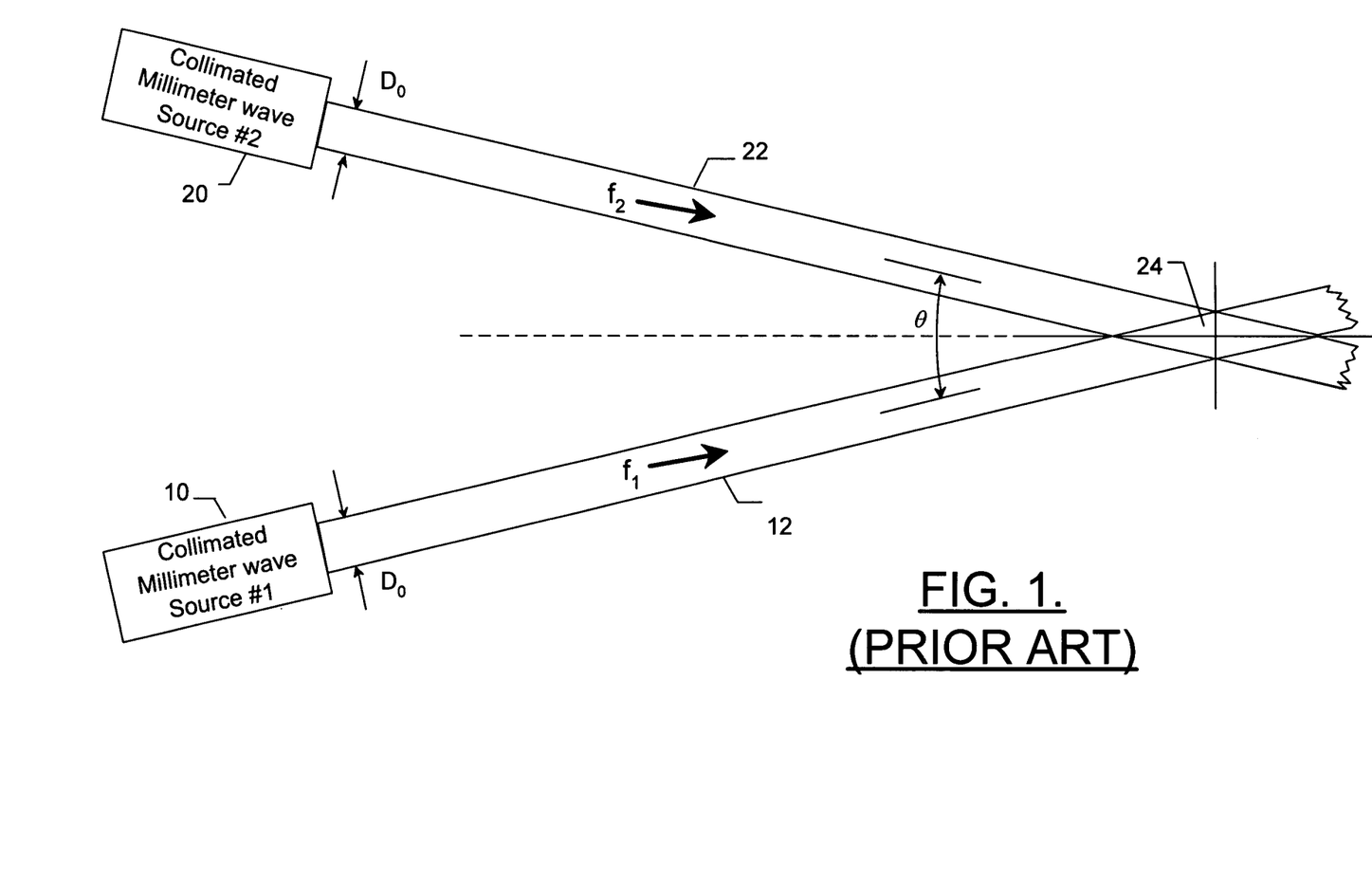
FIG. 1 is a schematic representing the effects of combining two coherent collimated electromagnetic waves.

As described in co-pending U.S. patent application Ser. No. 10/444,510, FIG. 1 illustrates two millimeter wave sources 10, 20 radiating collimated beams 12, 22 of electromagnetic radiation at two separate frequencies, $f_1$ and $f_2$, and in two intersecting directions that overlap at a distance. See U.S. patent application Ser. No. 10/444,510, entitled: Method And Apparatus For Directing Electromagnetic Radiation To Distant Locations, filed May 23, 2003, the contents of which are hereby incorporated by reference in its entirety. Generally, when two electromagnetic beams of different frequencies converge, the volume of the intersection, often referred to as the interference zone 24, will include a frequency component equal to the difference in frequency of the two beams, which is defined herein as the interference difference frequency, $\Delta f$. More specifically, the electromagnetic interference at the interference difference frequency, $\Delta f$, is optimal in that the electromagnetic interference field strength is at a maximum when the beams are diffraction limited and collimated having substantially equal intensities and with aligned polarizations. When the interference difference frequency is incident upon electronic components, the resultant field will interfere with the operation of the electronics.

At the interference difference frequency, $\Delta f$ voltages and currents are generated by intermodulation through nonlinear surface and volume effects (such as oxide layers, corroded surfaces, etc.), also by nonlinear electronic circuit parts and components, such as diodes and transistors, which are common to integrated circuits, receiver front-ends, and other circuit parts that may resonate with either or both the main and difference frequencies that are projected. For example, when the collimated and coherent outputs of two distinct millimeter wave antennas are 100 GHz and 101 GHz and there is a nonlinear component in the interference zone, there will be a 1 GHz component created in the electrical circuits that are connected to the non-linear components. Physically, the interference pattern created in the interference zone of collimated parallel polarized beams is a fringe field where the fringe planes are parallel to one another. The fringe planes are traveling in a direction perpendicular to the planes at the rate of the interference difference frequency, i.e. difference between the frequencies. The fringe planes are separated by the fringe period, $\lambda_f$, which is determined by $$\lambda_f = \frac{\lambda_0}{2 \sin\frac{\theta}{2}} \quad (1)$$

where $\lambda_0$ is the average wavelength of the two collimated beams, and $\theta$ is the angle of intersection between the two collimated beams. As can be seen, the fringe period depends upon the angle of intersection of the intersecting beams. Additionally, when the beams are at substantially equivalent field strengths, full amplitude modulation of the interference field will be achieved.

Figure 2:
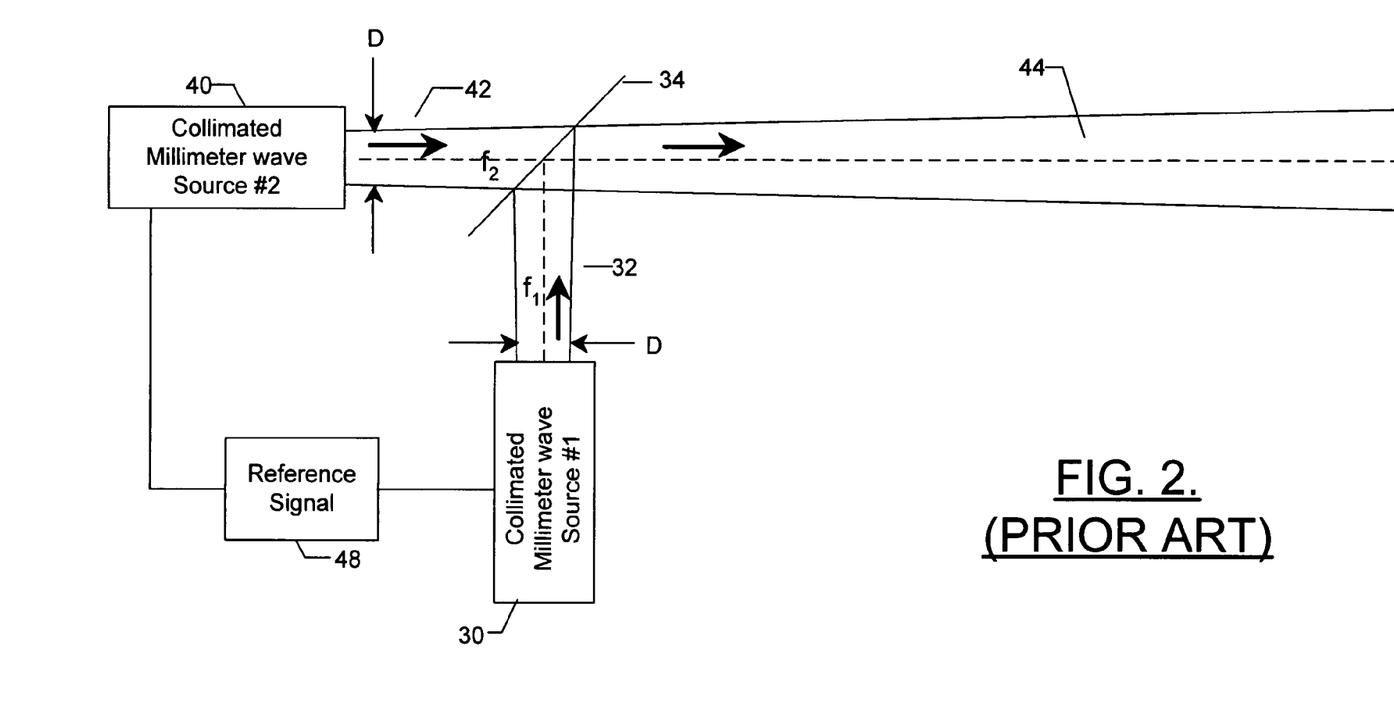
FIG. 2 is a schematic representing the effects of combining two coherent collimated electromagnetic waves with a polarization beam combiner.

FIG. 2 illustrates an alternate method to converge electromagnetic beams at a distance in a special case of the converging angle $\theta=0$. Two millimeter wave sources 30, 40 radiate collimated beams 32, 42 of electromagnetic radiation at two separate frequencies, $f_1$ and $f_2$, and in the direction of a polarization beam combiner 34. The polarization beam combiner combines orthogonally polarized beams by reflecting one beam and permitting transmission therethrough of the other beam. The resultant output is therefore the combined beams of both collimated beams 32, 42 having an interference difference frequency as described above. Again, for example, if $f_1=100$ GHz and $f_2=101$ GHz, the resultant interference difference frequency $\Delta f=1$ GHz. In contrast to the above description, however, the intersection angle, $\theta$, between the two beams is reduced to zero. As such, the fringe period has become infinite, that is to say that there are now no fringes and no spatial variation of intensity in any plane perpendicular to the direction of beam propagation.

In a typical arrangement, the polarization beam combiner surface is oriented at 45 degrees with respect to the beams (32, 42 in FIG. 2). The polarization beam combiner 34 is arranged to transmit the linearly polarized incident beam 42 with the minimum of loss. The other beam (32 in FIG. 2) will be polarized orthogonal to the first beam to obtain maximum reflection through the polarizer. Once these two beams are combined, they are superimposed and may be directed. That is to say that both beams 32, 42 are transmitted within one effective beam rather than separate converging beams (as described in FIG. 1), and the resultant interference zone 44 is the volume occupied by the merged beams, from the polarizer and beyond.

While a linear polarization beam combiner 34 has been discussed above other embodiments of beam combiners, known to those of ordinary skill in the art, including beam splitters, circular polarization beam combiners, and the like, may be substituted accordingly. Additional information relating to superimposition of electromagnetic beams is further described in the background, above, and in co-pending U.S. patent application Ser. No. 10/444,510 incorporated herein by reference.

Having developed methods of effectively combining electromagnetic beams at distant locations, it would be desirable to utilize the difference frequency generated in these interactions. Microwave transmitters and receivers, such as those that are part of military and civilian radar systems can be identified by their active emissions. To evade detection, microwave transmitters avoid transmitting or power down entirely. In such detection avoidance circumstances, transmitters and receivers are powered up only for brief periods at a time, making them practically invisible to commonly used electronic surveillance measures. There is no presently available method to detect, locate and identify the presence of inactive microwave receivers from long ranges. Interactions created by electromagnetic interference, as described above, may aid in identification of such inactive microwave devices.

As used herein, several terms should first be defined. Microwaves are the radiation that lies in the centimeter wavelength range of the electromagnetic (EM) spectrum (in other words: 1 cm<λ<100 cm; that is, the frequency of radiation in the range between 300 MHz and 30 GHz, also known as microwave frequencies). Electromagnetic radiation having a wavelength longer then 1 meter (or frequencies lower than 300 MHz) will be called "Radio Waves" or just "Radio Frequency" (RF). For simplicity in this disclosure, the RF spectrum is considered to cover all frequencies between DC (0 Hz) and 300 MHz. Millimeter Waves are the radiation that lies in the range of frequencies from 30 GHz to 300 GHz, where the radiation's wavelength lies in the 1 mm<λ<10 mm range. Finally, electromagnetic frequencies from 300 GHz to 3 THz are described as submillimeter waves, but on some occasions are often lumped with millimeter waves. As known to those of ordinary skill in the art, for practical purposes the "boundaries" for these above four frequency ranges are often not precisely observed. For example, a cell phone antenna (and its circuitry operating in the 2.5+GHz range) is associated with RF terminology and considered as part of RF engineering. A waveguide component for example, covering the Ka band at a frequency around 35 GHz is usually called a microwave (and not a millimeter wave) component, etc. Accordingly, these terms are used for purposes of consistently describing the invention, but it will be understood to one of ordinary skill in the art that alternative nomenclatures may be used in more or less consistent manners.

SUMMARY OF THE INVENTION

In accordance with one embodiment of the invention, a method of detecting, locating, and identifying microwave transmitters and receivers at distant locations is provided. The method includes transmitting first and second electromagnetic beams at first and second frequencies, respectively, in first and second directions. The second frequency is offset from the first frequency to define an interference difference frequency. As such, the first and second electromagnetic beams interfere at a far field distance corresponding to an intersection of the first and second electromagnetic beams. In the far field the beams interfere with microwave devices that will reradiate under carefully controlled conditions of the illuminating fields. The method includes detecting the return radiation at the difference frequency and locating the interference zone to determine the location of the microwave device. Further, the method according to this embodiment of the invention includes identifying the microwave device (it's frequency of operation, polarization, etc.) according to the return radiation at the difference frequency.

The step of locating may include several different aspects, including simply determining the azimuth location based upon the direction of either the first or second directions. Alternatively, the step of locating may include triangulation of location based upon the intersection of the first and second directions. Identification of the microwave device also includes many aspects, including determining a cut-off frequency from the return radiation at the difference frequency, and comparing the cut-off frequency with other microwave devices to determine the type of microwave device. In other embodiments the identification may include spectrally analyzing the return radiation at the difference frequency and comparing the spectral analysis to characteristics ("spectral signatures") of other microwave devices to determine the type of microwave device.

Also provided by the invention is an apparatus for detecting, locating, and identifying microwave transmitters and receivers at distant locations. The apparatus is an interrogator-receiver and includes first and second transmitters configured to transmit first and second electromagnetic beams at first and second frequencies, respectively, in first and second directions. Again, the second frequency is offset from the first frequency to define an interference difference frequency. Also, the first and second transmitters are configured such that the first and second beams interfere with a target microwave device at a far field distance. A receiver is configured to receive return radiation at the difference frequency generated from the interference with the target microwave device. In this regard, the reception permits detection of the return signal by the apparatus. A processor is then configured to identify the microwave device according to characteristics of the return signal.

Various other aspects of the interrogator-receiver apparatus may include a scanner for scanning the dual outgoing beam through an area to detect a microwave device. For example, scan mirrors capable of reflecting first and second electromagnetic beams may be employed to control the beam direction. Additionally, a beam combiner may be employed for combining the first and second electromagnetic beams into parallel paths.

The present invention provides the methods and apparatuses for detecting, locating, and identifying microwave transmitters and receivers at distant locations. Applications of the invention include locating and characterizing the microwave devices based upon their return radiation at the difference frequency. Many other advantages of the invention will become apparent to those skilled in the art with reference to the following descriptions.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

According to the method for detecting, locating, and identifying microwave transmitters and receivers at distant locations, collimated beams of electromagnetic radiation at two separate frequencies, $f_1$ and $f_2$, and in two intersecting directions, converge at a distance to form an interference zone. The interference zone, in turn, will be directed toward a target at a distance. A target has electronic components comprising one or more conductors, such as those that comprise a microwave transmitter and receiver, that lie in the intersection volume and will be exposed to the remotely created electromagnetic field. Due to non-linear electronic characteristics of the target, the target will produce and reradiate the difference frequency via it's own antenna (horn, dish, dipole, monopole, etc.) as surface and volume emissions. The interference difference frequency, $\Delta f$, of the electromagnetic field will induce currents at the interference difference frequency, $\Delta f$, in any conductors (including semiconductors) within or near that volume. The induced currents then interfere with electrical or electronic components, especially when operating at or near one of its resonant frequencies. In this regard, commonly assigned and co-pending U.S. patent application Ser. No. 10/444,510 describes this process in greater detail and is hereby incorporated by reference in its entirety.

Of particular importance to the invention, the induced currents will reradiate at the resonant frequencies of circuits that exist within the microwave transmitter or receiver at the target. Electromagnetic (EM) radiation in the RF and microwave ranges can interact with most electronic equipment, especially when the appropriate frequency or frequencies are chosen. Receivers and transmitter waveguides with tuned antennas are quite susceptible for such interaction. For a strong interference field, the reradiation by waveguide and antenna of the microwave transmitter or receiver can be detected by an interrogator-receiver that observes the reradiation pattern even when located at large distances. In detecting the reradiated field, the location of the microwave transmitter or receiver can easily be determined through triangulation and other geometric location determining methods, as the intersection volume of the difference frequencies are known. As used herein, locating the microwave device includes azimuth location (such as a line of bearing) of a target, and may alternatively include location of distance, bearing, and elevation from triangulation.

In addition to locating the microwave device, the reradiation pattern can be analyzed for various frequency responses in order to identify a microwave transmitter or receiver from the known characteristics of such transmitters and receivers. As used herein, identifying a microwave device may include simple methods such as determining a cut-off frequency or more complex spectral analysis. In the simple cut-off frequency case, for example, in a k-band microwave system, the characteristic cut-off frequency of the waveguide will be approximately 14.5 GHz. By transmitting difference frequencies, $\Delta f$, that are swept at and about the cut-off frequencies, the reradiated emission can be observed to determine whether the cut-off frequencies are characteristic of a k-band system. Similarly, harmonics of the reradiated frequency may also be observed and provide confirmation of such cut-off frequencies. These frequency analyses therefore require a plurality of difference frequencies (or the $\Delta f$ to be swept) to be generated in the interference area. Accordingly, the frequency of at least one of the collimated beams may be changed in the form of steps, ramps, or other waveforms, in order to provide a broader spectral characteristic response in the return radiation of the difference frequency.

Likewise, microwave systems operating in other bands exhibit characteristic reradiation frequency responses as a result of the interference and the nonlinear interactions of the target receiver front end. Accordingly, other frequency responses can be theoretically and empirically determined for classes and models of microwave transmitters and receivers in order to identify the target receiver. As known to those of skill in the art of passive electronic surveillance measures of active microwave emitters, complex and detailed spectral analysis is commonly used to identify classes and models of microwave emitters for this very purpose. Generally, empirical data have been obtained and stored in databases in order to compare spectral responses of various known operating systems to the systems that are being identified. In the same manner, empirical data may be obtained, associated with a particular microwave device, and stored in databases. In this regard, these detailed spectral responses of inactive (or passively operating) microwave transmitters and receivers may be used as a comparison for later identification of microwave devices.

Accordingly, an interrogator would employ two transmitters for creating electromagnetic interference at a distant location (such as described in co-pending and commonly assigned U.S. patent application Ser. No. 10/444,510) and also a receiver for remotely detecting reradiation from remote microwave transmitters and receivers. As such, microwave transmitters and receivers may be detected, located and identified, even when these receivers are turned off in order to avoid detection through conventional passive electronic surveillance. If desired for some embodiments, the interrogator device may optionally employ a high power transmitter that can disable such circuitry through high powered electromagnetic interference, as described in the co-pending U.S. patent application Ser. No. 10/444,510.

Figure 3:
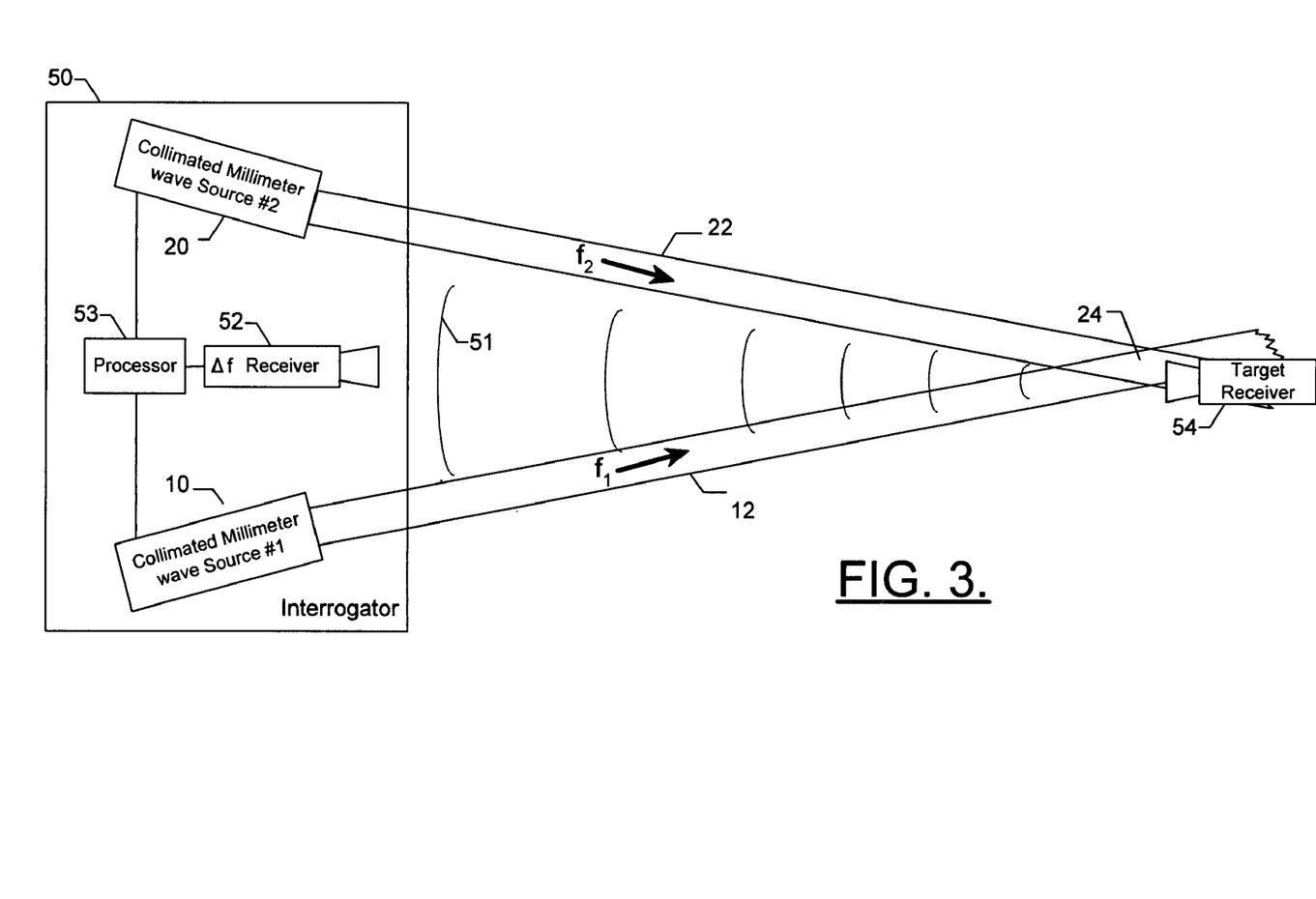
FIG. 3 is a schematic of an apparatus for detecting, locating, and identifying microwave transmitters and receivers at distant locations using electromagnetic interference according to one embodiment of the present invention.

Referring now to FIG. 3 and to one embodiment of an apparatus for identifying receivers at distant locations, an interrogator 50 comprises collimated mm Wave sources 10, 20 interconnected by a processor 52 and a receiver 52. The collimated mm Wave sources produce at least two converging electromagnetic beams directed at a distant target to create electromagnetic interference at a target receiver 54, by combining the beams as in the above background example. The collimated mm Wave sources are frequency locked together with a $\Delta f$ difference frequency, via the processor or a peripheral frequency device (not shown). The $\Delta f$ may be a plurality of frequencies through the centimeter-wave range of the microwave spectrum where most microwave transmitter and receiver targets (such as identifiable radar units) are expected to operate. The microwave receiver of the interrogator 50 is therefore tuned to the $\Delta f$ of the two transmitted beams in order to receive the reradiated return 51 at the difference frequency. The field of view of this microwave receiver may be continuously directed toward the target zone that is being illuminated by the dual beams.

The collimated beams that are sent out by the interrogator are at much higher frequencies than the operating frequency of the enemy radar receiver (typically in the 100 GHz range or higher). As a result, the beams can be more easily collimated and efficiently directed than the lower frequency microwave beams, as described in co-pending U.S. patent application Ser. No. 10/444,510. Additionally, collimated beams permit a scanned search pattern, which permits the interference zone to be directed to different areas. By searching different areas the apparatus may be employed to spatially locate the target receiver. Also, the higher the operating frequency, the higher the spatial resolution of the interrogator system.

As stated, the frequency difference, $\Delta f$, may be set to within the operating band of the target receiver. The usual operating frequencies of radar systems are between 1 and approximately 30 GHz of the microwave spectrum (L, S, X or K band). Receivers use nonlinear elements as detectors (such as microwave diodes) in conjunction with waveguides and antennas. The nonlinear interaction with the difference frequency produces the reradiation by way of demodulation. As such, when an enemy radar receiver antenna is turned toward the interrogator—even if this radar system is powered off—it will react to the illuminating mm Wave beams by producing the return radiation 51 at the difference frequency ($\Delta f$) back toward the interrogator 50, where it is detected, recorded and processed. The reradiation pattern will include the main and side lobes based upon the type of microwave antenna used, however, for purposes of illustration the return radiation 51 is presumed to be uni-directional.

The receiver 52 of the interrogator 50 therefore receives the reradiated difference frequency and provides the return to the processor 53. Just as receivers and processors employed in passive electronic surveillance measures systems are employed to spectrally analyze the emissions of active radar emissions, the processor of the apparatus for detecting, locating, and identifying microwave transmitters and receivers at distant locations may similarly be used to spectrally analyze the return. As empirical or theoretical data of known microwave device reradiation characteristics are compiled, they may be included in databases for reference by the processor. In this regard, the reradiated return signal may be compared to known responses in the database for identification of the microwave transmitter or receiver.

Additionally, a target will have other electronic components in the interference zone 24 of the combined electromagnetic beams. Similarly, due to the non-linear electronic characteristics of the electronics, portions of the target will produce and reradiate the interference difference frequency about the target receiver 54. The interference difference frequency, $\Delta f$, of the electromagnetic field will therefore induce currents at the interference difference frequency, $\Delta f$, in any conductors and semiconductors within that volume. The induced currents therefore interfere with the electrical or electronic components, especially those with resonant frequencies close to the induced interference difference frequency $\Delta f$. In this regard, the system permits not only identification of the target receiver, but may also be employed to disable the target receiver or interfere with its operation in various ways. When the interference fields strength is high enough, this may even cause damage to the target receiver, rendering it inoperable.

Figure 4:
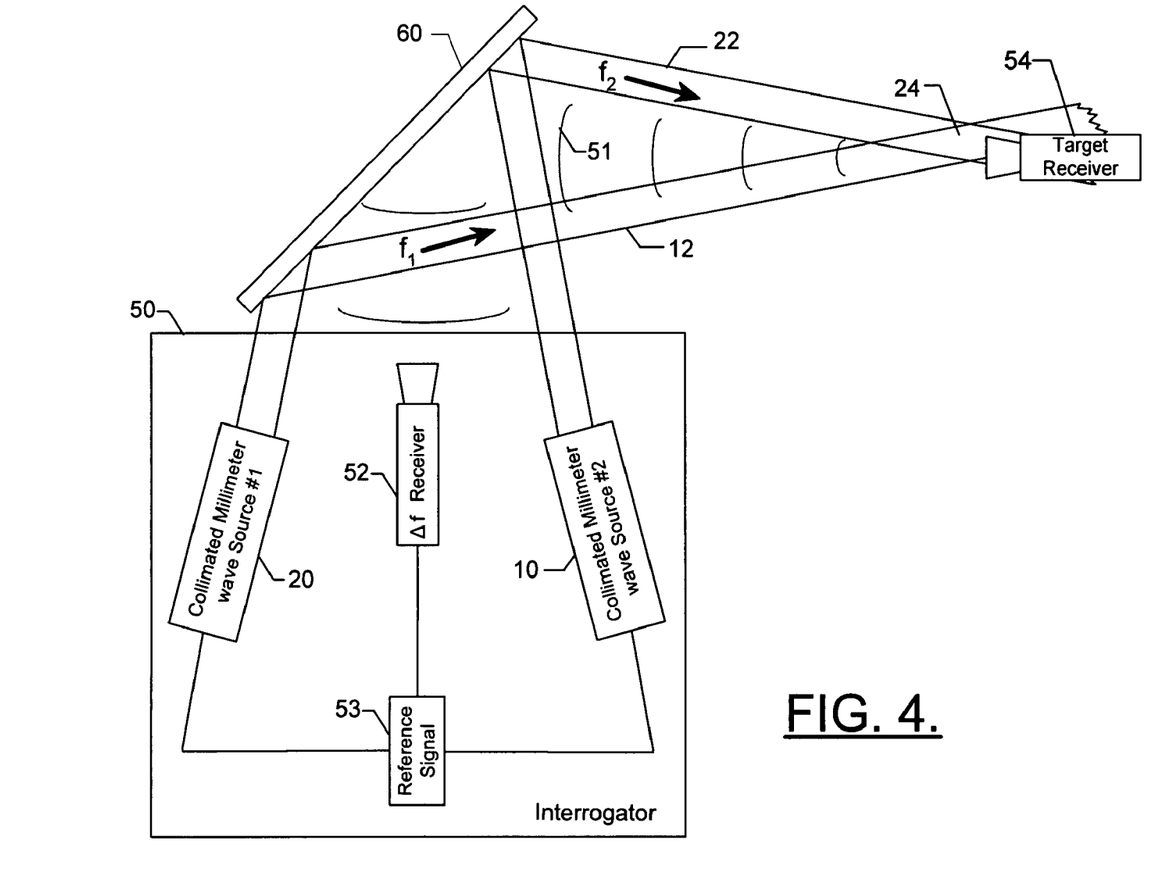
FIG. 4 is a schematic of an apparatus for detecting, locating, and identifying microwave transmitters and receivers at distant locations using electromagnetic interference according to an alternative embodiment of the present invention

Referring to FIG. 4 and an alternative embodiment of an apparatus for detecting, locating, and identifying microwave transmitters and receivers at distant locations, outputs of the two transmitters may be directed through a scanner mirror for scanning and transmitting to the far-field toward a target. In this regard, the mirror may rotate about an axis, or gimbaled axes, to redirect the collimated beams and the corresponding interference zone to selected locations. In this regard, the spatial recognition of the interrogator is improved and the location of the interference zone may easily be determined by the processor when coupled to the controls of the scan mirror. The return reradiation and interrogator receiver then operate in the same manner as described above to analyze the return in order to locate and identify the target receiver.

Figure 5:
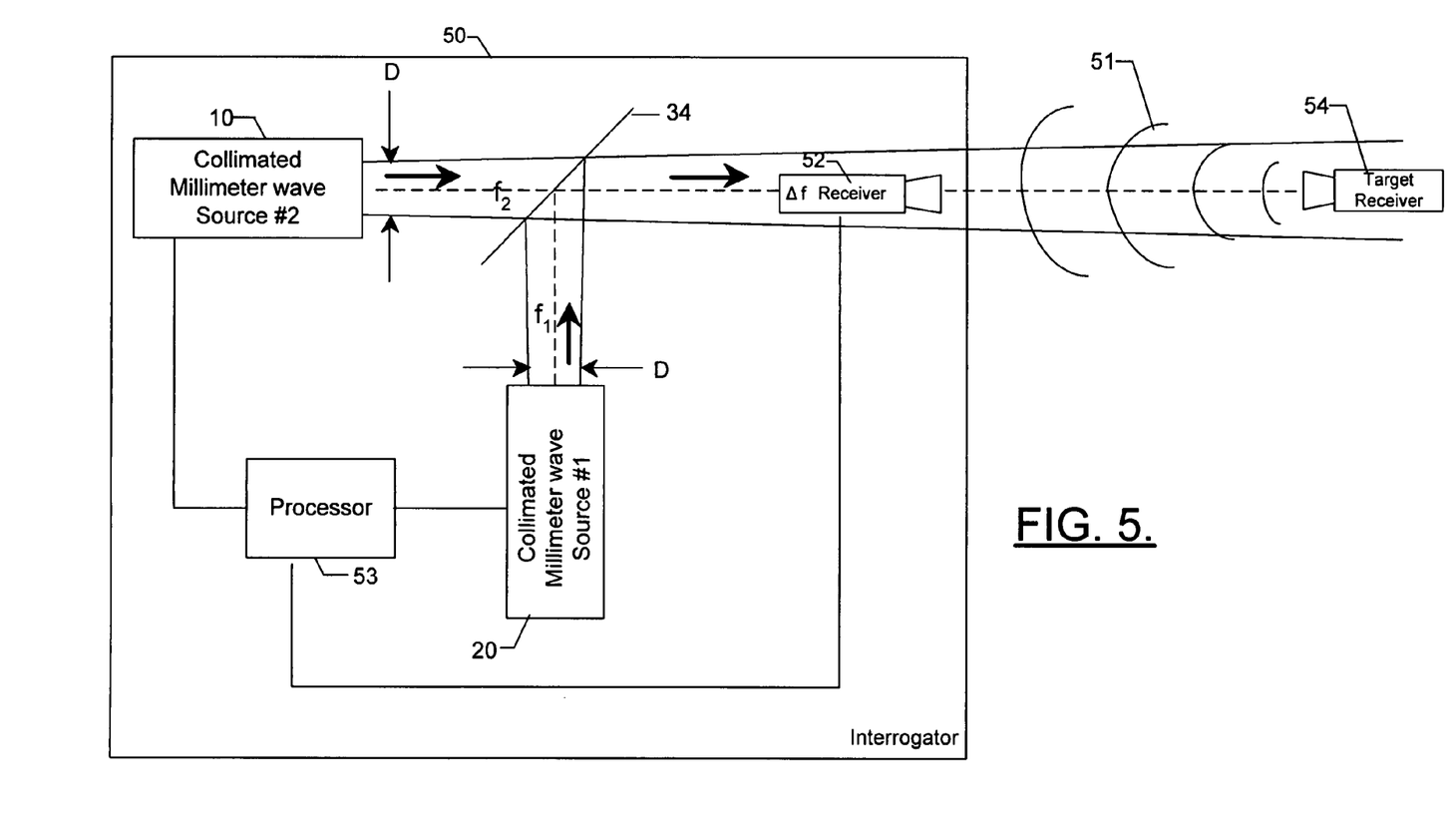
FIG. 5 is a schematic of an apparatus for detecting, locating, and identifying microwave transmitters and receivers at distant locations using electromagnetic interference according to another embodiment of the present invention.

In yet another embodiment shown in FIG. 5, an apparatus for detecting, locating, and identifying microwave transmitters and receivers at distant locations may create electromagnetic interference at a distance with a single beam collimation by first combining each electromagnetic beam at a polarization beam combiner 34. Again, the two electromagnetic beams are derived from frequency locked mm Wave sources, such as being coupled by a processor. Polarization and beam angles of the collimated mm Wave sources then permit directing both beams to the polarization beam combiner 34 to create a combined circularly polarized beam with an interference difference frequency. The combined beam is therefore collimated in a direction toward the target receiver. The return reradiation and interrogator receiver then operate in the same manner as described above to analyze the return in order to locate and identify the target receiver. Other methods and apparatuses to combine beams are known to those of ordinary skill in the art and may be substituted accordingly.

In summary, a method and apparatus for detecting, locating, and identifying microwave transmitters and receivers at distant locations may be employed as an interrogator in electronic surveillance measures against inactive or passive microwave transmitters and receivers. The methods and apparatuses of the invention cause interference in microwave receivers and transmitters, which is demodulated by the nonlinear electronics and is therefore reradiated back toward the interrogator. The reradiated return may be compared to the characteristics of microwave transmitters and receivers for identifying the class and type of microwave device. Additionally, the methods and apparatus for detecting, locating, and identifying microwave transmitters and receivers at distant locations may also include beam direction and spatial processing in order to identify the location of a microwave transmitter or receiver.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of detecting, locating, and identifying at least one of microwave transmitters or microwave receivers at a distant location, comprising:

transmitting a first electromagnetic beam at a first frequency and in a first direction;

transmitting a second electromagnetic beam at a second frequency and in a second direction, wherein the second frequency is offset from the first frequency to define an interference difference frequency, and the first and second electromagnetic beams interfere at a far field distance corresponding to an intersection of the first and second electromagnetic beams;

detecting a return radiation at the difference frequency produced by interference with a microwave device in the intersection, locating the interference zone to determine the location of the microwave device; and identifying the microwave device according to the return radiation at the difference frequency.

2. The method according to claim 1, wherein the step of locating comprises locating the interference zone azimuthally based upon the direction of at least one of the first or second directions.

3. The method according to claim 1, wherein the step of locating comprises locating the interference zone based upon triangulation of the first and second directions.

4. The method according to claim 1, wherein the step of identifying the microwave device comprises determining a cut-off frequency from the return radiation at the difference frequency.

5. The method according to claim 4, further comprising comparing the cut-off frequency with cut-off frequencies of microwave devices to determine the type of microwave device.

6. The method according to claim 1, wherein the step of identifying the microwave device comprises spectrally analyzing the return radiation at the difference frequency.

7. The method according to claim 6, further comprising comparing the spectral analysis to characteristics of other microwave devices to determine the type of microwave device.

8. The method according to claim 1, wherein the steps of transmitting the first and second electromagnetic beams further comprises collimating the first electromagnetic beam in a first direction and collimating the second electromagnetic beam in the second direction.

9. The method according to claim 1, wherein the steps of transmitting the first and second electromagnetic beams comprises further comprises combining the first and second beams in a third direction, and collimating the first and second beams in the third direction.

10. The method according to claim 9, wherein the step of combining the first and second electromagnetic beams comprises combining linearly polarized first and second beams through a polarization beam combiner.

11. The method according to claim 9, wherein the step of combining the first and second electromagnetic beams comprises combining circularly polarized first and second beams through a circular polarization beam combiner.

12. The method according to claim 1, wherein the step of transmitting further comprises scanning the first and second electromagnetic beams.

13. A method of detecting, locating, and identifying at least one of microwave transmitters or microwave receivers at a distant location, comprising:
    transmitting at least two electromagnetic beams separated by at least one interference difference frequency;
    collimating the at least two electromagnetic beams such that the collimated at least two electromagnetic beams interfere at a far field distance;
    detecting a return radiation at the difference frequency produced by interference with a microwave device in the far field distance;
    locating an interference zone to determine the location of the microwave device; and
    identifying the microwave device according to the return radiation at the difference frequency.

14. The method according to claim 13, wherein the step of locating comprises locating the interference zone azimuthally based upon the direction of at least one of the first or second directions.

15. The method according to claim 13, wherein the step of locating comprises locating the interference zone based upon triangulation of the first and second directions.

16. The method according to claim 13, wherein the step of identifying the microwave device comprises comparing return radiation at the difference frequency to characteristics of microwave devices.

17. The method according to claim 13, wherein the step of identifying the microwave device comprises spectrally analyzing the return radiation at the difference frequency and comparing the spectral analysis to characteristics of microwave devices.

18. The method according to claim 13, further comprising combining the at least two electromagnetic beams.

19. The method according to claim 13, further comprising scanning the at least two electromagnetic beams.

20. An apparatus for detecting, locating, and identifying at least one of microwave transmitters or microwave receivers at a distant location, comprising:
    a first transmitter configured to transmit a first electromagnetic beam at a first frequency and in a first direction;
    a second transmitter configured to transmit a second electromagnetic beam at a second frequency and in a second direction, wherein the second frequency is offset from the first frequency to define an interference difference frequency, and the first and second transmitters are configured such that the first and second beams interfere with a microwave device at a far field distance corresponding to an intersection of the first and second directions;
    a receiver configured to receive a return radiation at the difference frequency generated from the interference with the microwave device;
    a processor interconnected to the receiver and configured to identify the microwave device according to the return signal.

21. The apparatus according to claim 20, further comprising a scanner for scanning the first and second beams through an area to detect the microwave device.

22. The apparatus according to claim 20, wherein the scanner comprises a scan mirror capable of reflecting first and second electromagnetic beams.

23. The apparatus according to claim 20, further comprising a beam combiner for combining the first and second electromagnetic beams.

24. The apparatus according to claim 20, further comprising a collimator for collimating the combined first and second electromagnetic beams in a third direction.

25. The apparatus according to claim 20, further comprising a first collimator for collimating the first electromagnetic beam in the first direction, and a second collimator for collimating the second electromagnetic beam in the second direction.

* * * * *